United States Patent
Gakhar et al.

(10) Patent No.: US 10,445,143 B2
(45) Date of Patent: Oct. 15, 2019

(54) DEVICE REPLACEMENT FOR HYPER-CONVERGED INFRASTRUCTURE COMPUTING ENVIRONMENTS

(71) Applicant: VMWARE, INC., Palo Alto, CA (US)

(72) Inventors: Suket Gakhar, Bangalore (IN); Vishesh Kumar Nirwal, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 65 days.

(21) Appl. No.: 15/684,965

(22) Filed: Aug. 24, 2017

(65) Prior Publication Data
US 2018/0365064 A1  Dec. 20, 2018

(30) Foreign Application Priority Data
Jun. 14, 2017 (IN) .............................. 201741020785

(51) Int. Cl.
*G06F 9/46* (2006.01)
*G06F 9/50* (2006.01)
*G06F 9/455* (2018.01)

(52) U.S. Cl.
CPC ............ *G06F 9/505* (2013.01); *G06F 9/5083* (2013.01); *G06F 9/455* (2013.01); *G06F 2209/501* (2013.01)

(58) Field of Classification Search
CPC ........................................................ G06F 9/52
USPC ........................................................ 718/104
See application file for complete search history.

(56) References Cited

U.S. PATENT DOCUMENTS

| 4,680,710 A * | 7/1987 | Kizilbash | G09G 5/246 178/30 |
|---|---|---|---|
| 8,458,719 B2 * | 6/2013 | Wellerdiek | G06F 9/5011 718/104 |
| 9,465,658 B1 * | 10/2016 | Shashi | G06F 9/4881 |
| 9,846,590 B2 * | 12/2017 | Chen | G06F 9/45558 |
| 2004/0181788 A1 * | 9/2004 | Kester | G06F 21/50 717/168 |
| 2008/0235378 A1 * | 9/2008 | Fried | G06F 9/4856 709/226 |
| 2010/0050180 A1 * | 2/2010 | Amsterdam | G06F 9/5027 718/104 |
| 2011/0099548 A1 * | 4/2011 | Shen | G06F 9/45558 718/1 |
| 2011/0154350 A1 * | 6/2011 | Doyle | G06F 9/5044 718/104 |
| 2012/0131591 A1 * | 5/2012 | Moorthi | G06Q 10/06 718/104 |
| 2013/0042123 A1 * | 2/2013 | Smith | G06F 9/5077 713/300 |

(Continued)

*Primary Examiner* — Mehran Kamran
(74) *Attorney, Agent, or Firm* — Thomas | Horstemeyer, LLP

(57) ABSTRACT

Disclosed are various examples for device replacement for device replacement in hyper-converged infrastructure environments. A workload hash for a workload to be processed by a hyper-converged compacting device can be compared to a device hash for the hyper-converged computing device to determine whether to assign the workload to the hyper-converged computing device for processing. When a new device is added to a hyper-converged infrastructure environment, a device has for the new device can be generated and workloads having low resources can be identified for reassignment to the new device.

20 Claims, 11 Drawing Sheets

(56) References Cited

U.S. PATENT DOCUMENTS

| | | | |
|---|---|---|---|
| 2014/0047095 A1* | 2/2014 | Breternitz | G06F 9/5072 709/224 |
| 2014/0068608 A1 | 3/2014 | Kulkarni | G06F 9/45558 718/1 |
| 2014/0244643 A1* | 8/2014 | Basak | G06F 17/3071 707/737 |
| 2014/0244892 A1* | 8/2014 | Goss | G06F 3/0653 711/102 |
| 2014/0258446 A1* | 9/2014 | Bursell | G06F 15/177 709/217 |
| 2015/0026582 A1* | 1/2015 | Basak | H04L 41/22 715/734 |
| 2015/0106823 A1* | 4/2015 | Canoy | G06F 9/505 718/105 |
| 2015/0379420 A1* | 12/2015 | Basak | G06F 17/3007 706/12 |
| 2016/0092267 A1* | 3/2016 | Boyacigiller | G06Q 10/0633 718/103 |
| 2016/0292011 A1* | 10/2016 | Colson | G06F 9/5044 |
| 2016/0378532 A1* | 12/2016 | Vincent | G06F 9/45558 718/1 |
| 2017/0289139 A1* | 10/2017 | Guo | H04L 29/06 |
| 2018/0024860 A1* | 1/2018 | Balle | H03M 7/40 718/104 |
| 2018/0129963 A1* | 5/2018 | Razin | G06N 5/022 |
| 2018/0260566 A1* | 9/2018 | Chaganti | G06F 21/57 |

\* cited by examiner

| workload_id | host_id | host_status | rack_id | workload_bundle |
|---|---|---|---|---|
| ... | ... | ... | ... | ... |
| A | N6 | operational | R1 | bundleA |
| A | N9 | operational | R1 | bundleA |
| A | N10 | not operational | R1 | bundleA |
| B | N5 | operational | R2 | bundleB |
| B | N4 | operational | R3 | bundleB |
| B | N3 | operational | R4 | bundleB |
| B | N10 | not operational | R1 | bundleB |
| C | N1 | operational | R1 | bundleC |
| C | N0 | operational | R2 | bundleC |
| C | N11 | operational | R2 | bundleC |
| C | N10 | not operational | R1 | bundleC |
| ... | ... | ... | ... | ... |

FIG. 4  ↙400

| id | device_hash 503 | node_id | device_type |
|---|---|---|---|
| ... | ... | ... | ... |
| 42 | 9e47104a488fed7... | N10 | SERVER |
| 43 | 879gdh4a988326... | N9 | SERVER |
| 44 | 9e47104a488fed7... | N13 | SERVER |
| ... | ... | ... | ... |

*FIG. 6*

| workload _type | workload _id | rack_id | switch _id | switch_con fig_type | operation_data | switch _type | vcf_task | timesta mp | port_nu mbers | host_names |
|---|---|---|---|---|---|---|---|---|---|---|
| ... | ... | ... | ... | ... | ... | ... | ... | ... | ... | ... |
| V1 | WLD_2 | Rack 1 | TOR 1 | create_vlan | {"name":"bondname","id":"1030","t... | TOR | create_wor kload | 158125 5783 | {swp5,sw p6,swp7} | {Node8,Node 9,Node10} |
| V1 | WLD_2 | Rack 1 | TOR 2 | create_vlan | {"name":"bondname","id":"1030","t... | 1003a | create_wor kload | 158125 5788 | {swp5,sw p6,swp7} | {Node8,Node 9,Node10} |
| ... | ... | ... | ... | create_lacp | {"name":"bondname","id":"1030","t... | ... | create_wor kload | ... | ... | ... |
| ... | ... | ... | ... | config_mtu | {"name":"bondname","id":"1030","t... | ... | ... | ... | ... | ... |
| V1 | WLD_2 | Rack 1 | TOR 1 | delete_vlan | {"name":"bondname","id":"1030","t... | TOR | delete_wor kload | 158125 6788 | {swp5,sw p6,swp7} | {Node8,Node 9,Node10} |
| ... | ... | ... | ... | delete_lacp | {"name":"bondname","id":"1030","t... | ... | delete_wor kload | ... | ... | ... |
| ... | ... | ... | ... | create_vlan | {"name":"bondname","id":"1030","t... | ... | workload_e xpansion | ... | ... | ... |
| ... | ... | ... | ... | delete_vlan | | ... | workload_c ontraction | ... | ... | ... |
| ... | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

1000

```
{
  "name":"bondname",
  "id":"1030",
  "taggedPorts":{"swp5","swp6
  ","swp7"},
  "untaggedPorts":null,
  "ipAddress":null,
  "netmask":null,
  "igmp":null,
  "mtu":null
}
```

DEVICE REPLACEMENT FOR HYPER-CONVERGED INFRASTRUCTURE COMPUTING ENVIRONMENTS

RELATED APPLICATIONS

Benefit is claimed under 35 U.S.C. 119(a)-(d) to Foreign Application Serial No. 201741020785 filed in India entitled "DEVICE REPLACEMENT FOR HYPER-CONVERGED INFRASTRUCTURE COMPUTING ENVIRONMENTS", on Jun. 14, 2017, by VMware, Inc., which is herein incorporated in its entirety by reference for all purposes.

BACKGROUND

Hyper-converged infrastructure (HCI) is a type of virtual computing platform that converges compute, networking, virtualization, and storage into a single software-defined architecture. For instance, a single software application can interact with each of component of hardware and software as well as an underlying operating system. Hyper-converged infrastructures provide enterprises and other organizations with modular and expandable compute, storage, and network resources as well as system backup and recovery. In a hyper-converged infrastructure, compute, storage, and network resources are brought together using preconfigured and integrated hardware.

Since resources in a hyper-converged infrastructure system are pre-configured and highly integrated, ensuring network bandwidth for a particular task remains problematic, even when certain components have sufficient network capability. For example, a switch in, the hyper-converged infrastructure can become overburdened and incapable of handling bandwidth requirements for all hardware connected to the switch. When the networks become loaded, switches can drop data packets. This can affect overall performance of a data center.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a drawing of an example database format for a workload detail table that maintains a listing of workloads in a hyper-converged computing environment.

FIG. 6 is a drawing of an example database format for maintaining device hashes for hyper-converged computing devices.

FIG. 10 is a drawing of an example database format for maintaining configurations of hyper-converged computing devices.

DETAILED DESCRIPTION

The present disclosure relates to device replacement in hyper-converged infrastructure computing environments. Hyper-converged computing environments can include thousands of various devices, such as servers (also referred to as "nodes" or "hosts") and network switches. Over time, hyper-converged infrastructure services can perform various configurations of a server, such as partitioning the server into multiple virtual machines. If a server goes down, it can affect workloads processing in a hyper-converged computing environment. Accordingly, examples described herein can be performed to return workloads back to normal state, for example, by replacing a poorly performing server with a new one or by provisioning an existing available server.

More specifically, various examples are disclosed for reassigning workloads from failing nodes to available nodes sing hashes for fast and lightweight comparisons. In one example, a hyper-converged management service can generate a workload hash is generated for a workload assigned to a hyper-converged computing device. In the event the hyper-converged computing device begins to fail or otherwise becomes not operational, the hyper-converged management service can compare the workload hash to device hashes for available computing devices for reassigned. If the hashes have a similarity exceeding a similarity threshold, the workload can be reassigned from the failing computing device to the available computing device. When new devices are added to a hyper-converged computing environment, a device hash for the new device can be generated and workloads having low resources can be identified for reassignment to the new device. Additionally, configurations performed on a given device in the hyper-converged computing environment are maintained as a data structure stored in memory for fast retrieval so that, in the event the given device fails, a replacement can be reconfigured using the exact configurations of the failing device.

Figure 1:
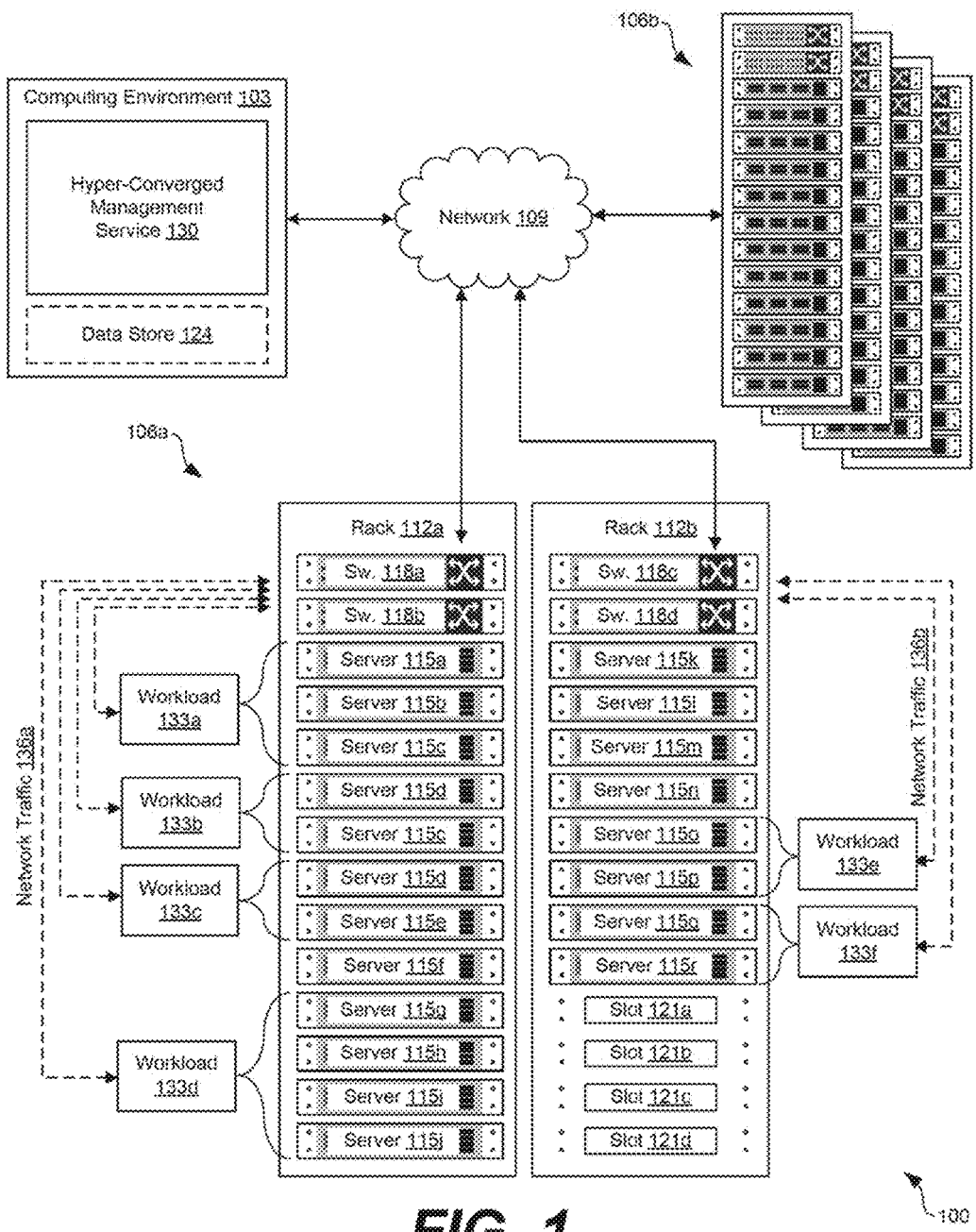
FIG. 1 is a drawing of an example of a hyper-converged computing environment.

With reference to FIG. 1, an example of a hyper-converged computing environment 100 is shown. The hyper-converged computing environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

In various embodiments, the computing systems 106 can include a plurality of devices installed in racks 112 which can make up a server bank or a computer bank. The devices in the computing systems 106 can include any number of physical machines and virtual machines. For example, a computing environment 103 can include an enterprise computing environment that includes hundreds or even thousands of physical and virtual machines implemented in devices stored in racks 112 distributed geographically and connected to one another through the network 109. It is understood that any virtual machine is implemented using at least one physical device.

The devices in the racks 112 can include, for example, memory and storage devices, servers 115a . . . 115r, central processing units (CPUs), graphics processing units (GPUs), switches 118a . . . 118d, power supplies, and similar devices. The devices, such as servers 115 and switches 118, can have dimensions suitable for quick installation in slots 121a . . . 121d on the racks 112. In various examples, the servers 115 can include requisite physical hardware and software to create and manage a virtualization infrastructure. The physical hardware for a server 115 can include a CPU, GPU, data, bus, memory, and other components. The servers 115 can include a pre-configured hyper-converged computing device where a hyper-converged computing device includes pre-tested, pre-configured, and pre-integrated storage, server and network components, including, software, that are positioned in an enclosure installed in a slot 121 on a rack 112.

Additionally, each server 115 in the hyper-converged computing environment 100 can include a hypervisor. In some examples, a hypervisor can be installed on a server 115 to support a virtual machine execution space within which one or more virtual machines (VMs) can be concurrently instantiated and executed. In some examples, the hypervisor can include VMware ESX™ hypervisor or a VMware ESXi™ hypervisor. It is understood that the computing systems 106 are scalable, meaning that the computing systems 106 in the hyper-converged computing environment 100 can be scaled to include additional servers 115, switches 118, and other components.

Similarly, the computing environment 103 can include, for example, a server or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. Although shown separately from the computing systems 106, it is understood that the computing environment 103 can be implemented in the computing systems 106.

The computing environment 103 can also include or be operated as one or more virtualized computer instances. For purposes of convenience, the computing environs rent 103 is referred to herein in the singular. Even though the computing environment 103 is referred to in the singular, it is understood that a plurality of computing environments 103 can be employed in the various arrangements as described above. As the computing environment 103 communicates with the computing systems 106 over the network 109, sometimes remotely, the computing environment 103 can be described as a remote computing environment 103 in some examples.

The computing environment 103 can include a data store 124. The data store 124 can include memory of the computing environment 103, mass storage resources of the computing environment 103, or any other storage resources on which data can be stored by the computing environment 103. The data store 124 can include memory of the servers 115 in some examples. The data stored in the data store 124, for example, can be associated with the operation of the various services or functional entities described below.

The components executed on the computing environment 103 can include, for example, a hyper-converged management service 130 as well as other applications, services, processes, systems, engines, or functionality not discussed in detail herein. The hyper-converged management service 130 can be executed, to oversee the operation of the hyper-converged computing environment 100 through management of the computing systems 106 as well as the devices and software that make up the computing systems 106. In some examples, an enterprise, organization, or other entity, can operate the hyper-converged management service 130 to oversee or manage the operation of devices in the racks 112, such as servers 115 and switches 118.

Hyper-converged computing devices in the computing systems 106 can process workloads 133a . . . 133f. Workloads 133 can include the amount of processing that a server 115 has been instructed to process at a given time. The workloads 133 can be associated with applications executing on the servers 115. For instance, the workloads 133 can include tasks to be process to provide employees of an enterprise with remote desktop sessions or other virtualized computing sessions. The hyper-converged management service 130 can maintain a listing of active or inactive workloads 133 as well as oversee the assignment of various workloads 133 to various devices in the computing systems 106. For instance, the hyper-converged management service 130 can assign a workload 133 lacking in available resources to a server 115 that has resources sufficient to handle the workload 133. The workloads 133 can be routed to various servers 115 by the switches 118 as network traffic 136a . . . 136b.

The hyper-converged management service 130 can determine benchmarks to evaluate performance of hyper-converged computing devices in the racks 112. To this end, the hyper-converged management service 130 can determine or generate metrics describing how easily a server 115 processes a workload 133 or how quickly a switch 118 routes network traffic 136, which in turn can be divided into response time reflecting the time between a user request and a response to the request from the computing system 106 as well as throughput reflecting how much work is performed over a given time frame.

Figure 2:
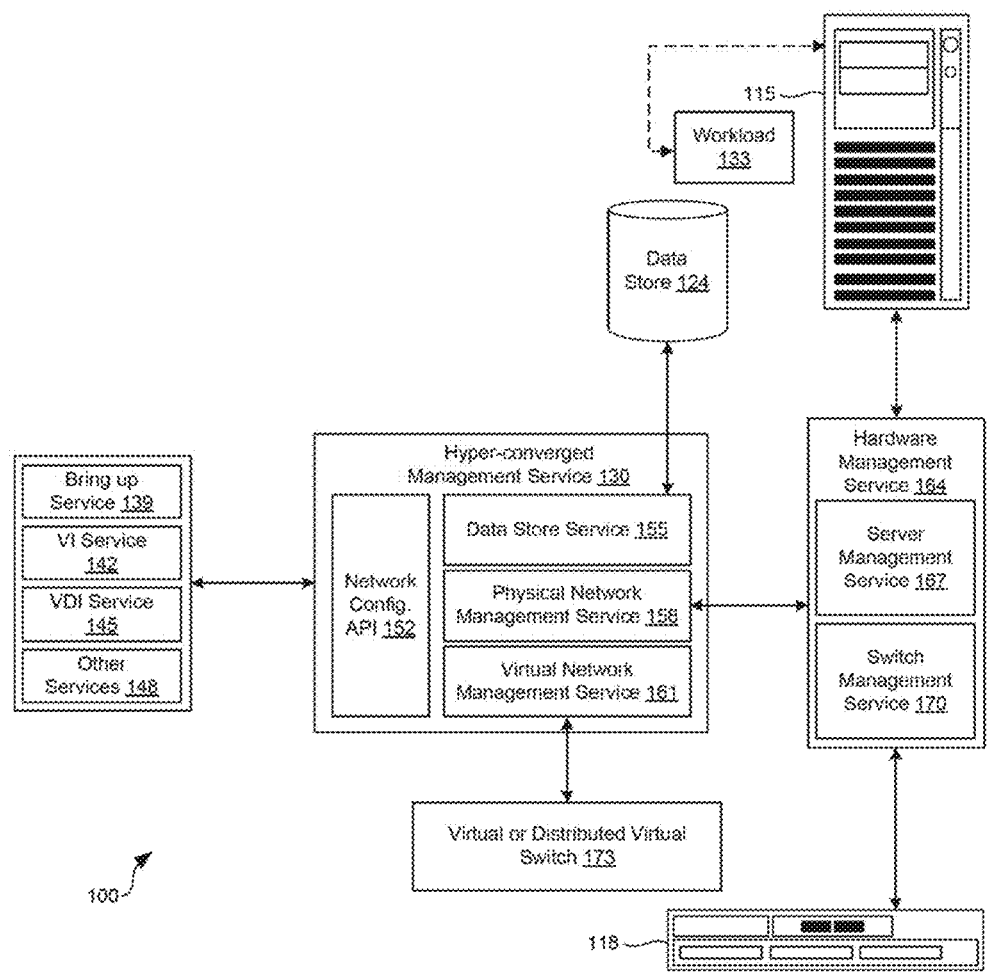
FIG. 2 is a drawing of another example of the hyper-converged computing environment of FIG. 1.

Turning now to FIG. 2, another example of the hyper-converged computing environment 100 is shown. The hyper-converged computing environment 100 illustrates various services interacting with the hyper-converged management service 130. In some examples, the hyper-converged management service 130 can include a service responsible for physical and virtual configurations of devices in the racks 112. In some examples, the hyper-converged management service 130 interacts with a "bring up" service 139, a virtual infrastructure (VI) service 142, a virtual desktop infrastructure (VDI) service, as well as other services 148 as can be appreciated.

The bring up service 139 can be executed to "bring up" a device in a computing system 106 such that it becomes an active part of the hyper-converged computing environment 100. For example, when a server 115 or a switch 118 is installed or powered on in the hyper-converged computing environment 100, the bring up service 139 can configure the server 115 or switch 118 to begin processing or routing workloads 133 as part of the overall environment.

The VI service 142 can provides access to the infrastructure management components, such as the objects that can be used to manage, monitor, and control life-cycle operations of virtual machines and other hyper-converged infrastructure components.

The VDI service 145 can include, for example, software that runs a desktop on a user's client device, such as a personal computer, laptop, or smartphone, from the servers 115 in the hyper-converged computing environment 100. In one example, desktop virtualization can include taking a user's desktop workstation and executing it on a server 115 as a virtual machine, such that the user can access the desktop workstation from anywhere using a lightweight client application, also referred to as a "thin client." Because the desktop workstation is hosted on a server 115 that handles all the processing for the desktop, the thin client has very small resource requirements and the client device owned by the user does not need to have powerful computing capabilities.

The bring up service 139, the VI service 142, the VDI service 145, or other service 148 can be controlled by the hyper-converged management service 130, for example, through a network configuration application programming interface (API) 152. For example, the hyper-converged management service 130 can send various configurations over the network 109 to the services that will act accordance with the configurations.

Additionally, the hyper-converged management service 130 can include a data store service 155, a physical network management service 158, and a virtual network management service 161. The data store service 155 can oversee storage or retrieval of data from the data store 124. For instance, the data store 124 can include one or more structured query language (SQL) or no-SQL databases and the data store service 155 can perform various queries to access information stored in memory. In some examples, the data store service 155 can retrieve hashes generated for workloads, devices, or other components of the hyper-converged computing environment 100, as will be discussed.

The physical network management service 158 can oversee operation of physical devices in the computing systems 106. For instance, the physical network management service 158 can interact with a hardware management service 164 to oversee operation of physical servers 115, physical switches 118, or other hardware devices the hyper-converged computing environment 100. The hardware management service in 164, some examples, can include a server management service 167, a switch management service 170, as well as other services. The server management service 167 can oversee operation of the physical servers 115 in the computing systems 106 of the hyper-converged computing environment 100. The switch management service 170 can oversee operation of the physical switches 118 in the computing systems 106 of the hyper-converged computing environment 100.

The virtual network management service 161 can oversee operation of virtual devices in the computing systems 106. For example, the virtual network management service 161 can oversee operation of virtual servers, virtual or distributed virtual switches 173, as well as other virtual devices in the hyper-converged computing environment 100.

Next, a general description of the operation of the various components of the hyper-converged computing environment 100 is provided. The hyper-converged management service 130 can assign workloads 133 to servers 115 or other computing devices in the hyper-converged computing environment 100. In the event a server 115 or other computing device fails, a difficult task of configuring a hyper-converged replacement task is generally required. During the replacement, workloads 133 can become non-operational and downstream performance of a data center or the services that it provides are negatively affected. Accordingly, various examples for device replacement and reassignment of workloads 133 are described.

In one example, the hyper-converged management service 130 can create and maintain a data structure for each workload 133 assigned to a device in the hyper-converged computing environment 100. The data structure can represent what kind of servers 115 are eligible to be used by or assigned to a workload 133. Hence, the data structure can include attributes that a device, such as a server 115, is required to have in order for the workload 133 to be assigned to the device.

Using the data structure, the hyper-converged management service 130 can generate a hash for each workload 133. Generating the hash can include, for example, converting the data structure to a string of alphanumeric characters having a length less than the original data structure. In some examples, certain portions or regions of the hash can correspond to certain attributes. The hash thus can be analyzed or used for attribute comparisons as opposed to the underlying data structure used to generate the hash.

Similarly, the hyper-converged management service 130 can generate a hash for each server 115 or other device in the hyper-converged computing environment 100. As a new server 115 or switch 118 is powered on in a rack 112, a data structure having attributes of the device can be created and maintained in the data store 124. The attributes for the devices can include, for example, the capabilities of the device. The capabilities can include, for example, memory availability, processor speed, networking speed, firmware versions, or other capabilities as will be described.

The data structure having the attributes of the server 115 can be hashed to generate a device hash 503. Certain portions or regions of the device hash 503 can correspond to certain attributes of the device. Hence, the device hash 503 can be analyzed or used for attribute comparisons as opposed to the underlying data structure used to generate the device hash 503.

In the event the hyper-converged management service 130 identifies a device having performance issues, the hyper-converged management service 130 can analyze a performance of the device. If the hyper-converged management service 130 determines that the performance of the device falls below the performance threshold, the hyper-converged management service 130 can identify one or more workloads 133 assigned to the device. As the device is not adequately performing, the workload 133 can be reassigned to another hyper-converged computing device.

To determine whether the attributes or requirements of the workload 133 match that of the hyper-converged computing device, the hyper-converged management service 130 can compare the hash generated for the workload 133 to hashes generated for the devices in the hyper-converged computing environment 100. As one or more regions of the hashes can correspond to certain attributes, the hyper-converged management service 130 can compare regions of the hash for the workload 133 to corresponding portions or regions of the hash of devices.

If the hyper-converged management service 130 determines that the hash for a workload matches a hash for an available device, the hyper-converged management service 130 can reassign the workload 133 to the available device. In other words, the workload 133 is transferred from the faulty device to an available device having attributes that match the requirements of the workload 133.

In some situations, however, an available device may not exist. Thus, an administrator can be instructed to replace the faulty device or add a new device to the hyper-converged computing environment 100. When a new device has been added that is available for processing, the hyper-converged management service 130 can configure the newly installed server to match the configurations of the faulty server. Thereafter, the hyper-converged management service 130 can reassign the workload 133 to the newly installed device that is now configured to process the workload 133 using the settings previously applied to the failing device. The data store service 155 can update the data store 124 to reflect the reassignment of the workload 133 to the new device.

Figure 3:
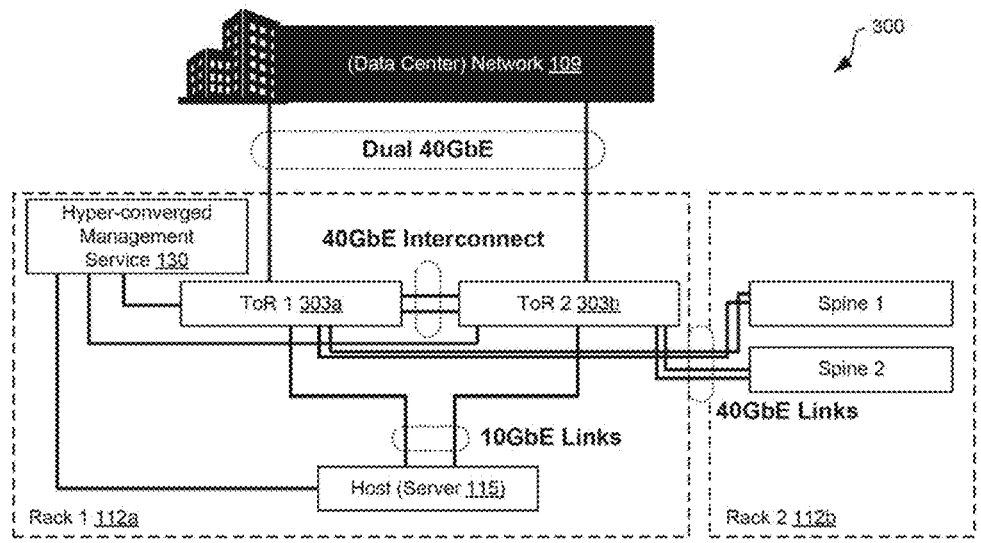
FIG. 3 is a drawing of an example of a wiring diagram used to replace a device in a hyper-converged computing environment.

Referring next to FIG. 3, an example of a wiring diagram 300 used to replace a device in the hyper-converged computing environment 100 is shown. In some situations, a hyper-converged computing device, such as a server 115, can fail and potentially require replacement. When the hyper-converged computing device fails, the workloads 133 assigned to the computing device become non-operational. Accordingly, in some examples, the hyper-converged management service 130 can evaluate current inventory of the hyper-converged computing environment 100 to identify other eligible and available devices available that can be used to return a workload 133 back to a healthy state. If no devices are available and eligible for replacement, an administrator can be instructed to add or replace a server 115 in the rack 112, per the wiring diagram shown in FIG. 3. For instance, a replacement host, such as a replacement server 115, can be installed in a first rack 112a and coupled to the hyper-converged management service 130 and one or more top of rack (ToR) devices 303a . . . 303b.

Turning now to FIG. 4, an example format for a database 400 used to maintain a workload detail table for workloads 133 in a hyper-converged computing environment 100 is shown according to various examples. The database 400 can be stored in the data store 124 for access by the data store service 155. Additionally, the data store service 155 can update or remove entries in the database 400. Each entry in the database 400 can correspond to a workload 133 in the hyper-converged computing environment 100. Each workload 133 can be assigned an identifier (workload_id), an identifier for a server 115 hosting the workload 133 (host_id), a status of the host server 115, and an identifier for the rack 112 in which the server 115 is located (rack_id). As some workloads 133 can be coalesced with other workloads 133, the database 400 can further include a bundle identifier (workload_bundle). A bundle of workloads 133 can be assigned to a server 115 or a group of servers 115. The identifier of the workload 133 (workload_id) can include a string that uniquely identifies a workload 133.

As the database 400 has multiple entries for a single workload 133, workload A for example, the database 400 illustrates that workload A is assigned to multiple servers 115, such as N8, N9, and N10, which are identifiers for the servers 115. The status of the server 115 can include "operational," "not operational," or some other value indicative of whether the server 115 is performing in accordance with its specifications. If the status of the server 115 is "not operational," the hyper-converged management service 130 can attempt to reassign a workload 133. For instance, as N10 is "not operational," the workloads 133 can be reassigned from N10 to another server 115.

Figure 5:
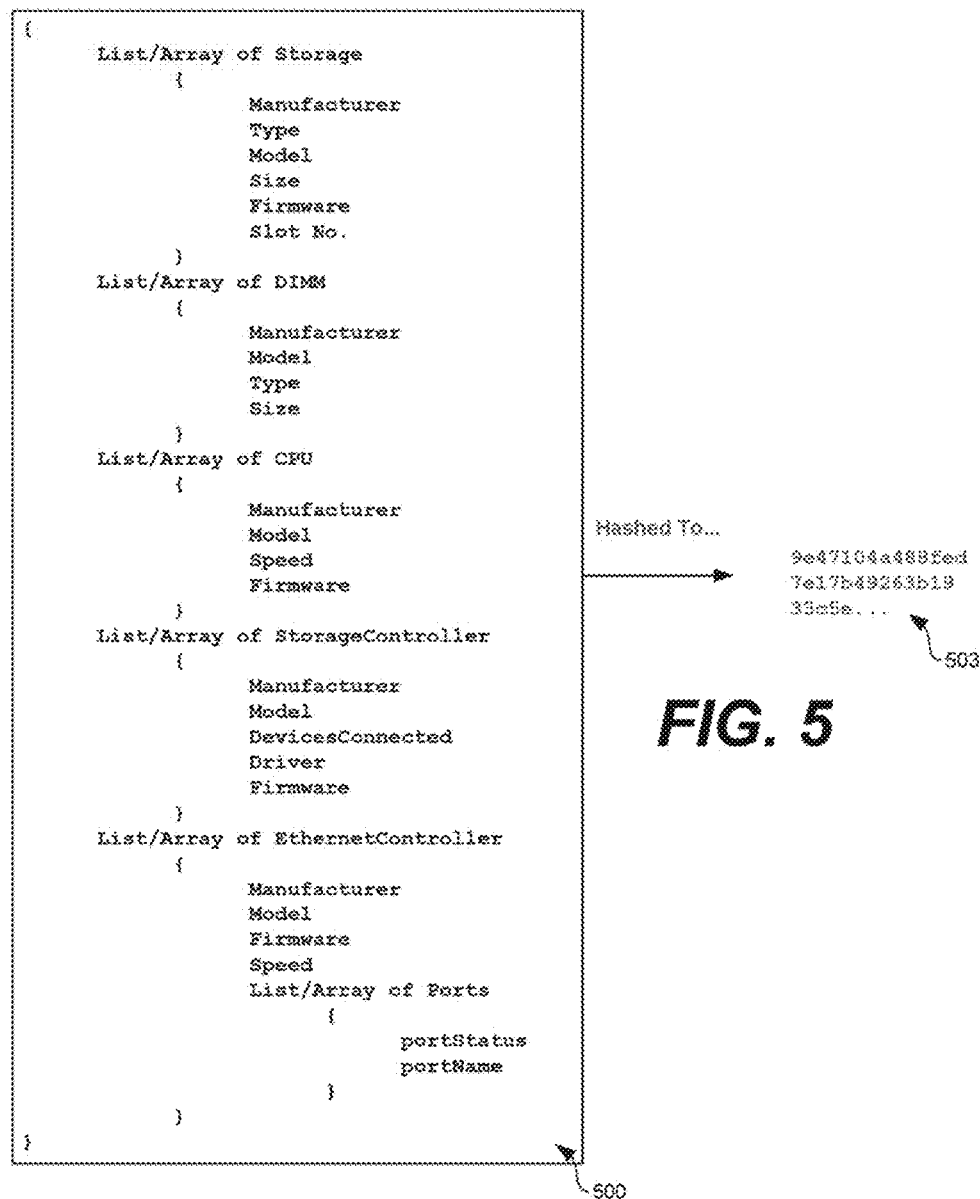
FIG. 5 is a drawing of an example device data structure used to generate a device hash for a hyper-converged computing device.

Moving on to FIG. 5, an example of a device data structure 500 for a hyper-converged computing device is shown according to various examples. The device data structure 500 can be stored in the data store 124 for access by the data store service 155. Additionally, the data store service 155 can update or remove entries in the device data structure 500. The device data structure 500 can include attributes for a device, such as a server 115, in the hyper-converged computing environment 100. The attributes can include, for example, information pertaining to storage, single in-line memory module (SIMM), dual in-line memory module (DIMM), CPU, storage controller, and Ethernet controller of the server 115, or similar information. For each physical or virtual component of the server 115, various information can be included in the device data structure 500, such as a manufacturer, a type, a model, a size, firmware version, driver version, speed, port status, port name, a number of a slot 121 on a rack 112, or other information.

The device data structure 500 can include a string of alphanumeric and symbolic characters. In some examples, the device data structure 500 can be hashed to generate a device hash 503. Hashing the device data structure 500 can include, for example, converting the device data structure 500 to a string of alphanumeric characters having a less amount of characters than the original device data structure 500. In some examples, the string can include non-alphanumeric characters.

When hashed, certain portions or regions of the device hash 503 can correspond to certain attributes of the device. To this end, the device hash 503, as opposed to the device data structure 500 itself, can be analyzed or used to identify or compare attributes of the device. In some examples, the hyper-converged management service 130 can generate the device data structure 500 and the device hash 503 during a "bring up" operation of a rack 112 or a server 115. For example, when a server 115 or a rack 112 is powered on or otherwise brought online in the hyper-converged computing environment 100, the hyper-converged management service 130 can generate the device data structure 500 and the device hash 503.

Referring next to FIG. 6, an example format for a database 600 used to maintain device hashes 503 for hyper-converged computing devices is shown according to various examples. The database 600 of FIG. 6 can be stored in the data store 124 for access by the data store service 155. Additionally, the data store service 155 can update or remove entries in the database 600. Each entry in the database 600 can correspond to a device in the hyper-converged computing environment 100, such as a server 115. Each server 115 can be assigned an identifier (id), a device hash 503 (device_hash), and a node identifier (node_id) that may correspond to the host_id column described in FIG. 4. Additionally, the database 600 can include a type of device (device_type). The identifier (id) and the node identifier (node_id) can include strings that uniquely identify a server 115 or other device in the hyper-converged computing environment 100. Alternatively, a node can consist of multiple servers 115. Hence, the node identifier can identify multiple servers 115. Using an identifier that uniquely identifies a server 115, the device hash 503 for the server 115 can be retrieved by the data store service 155.

Figures 7, 8:
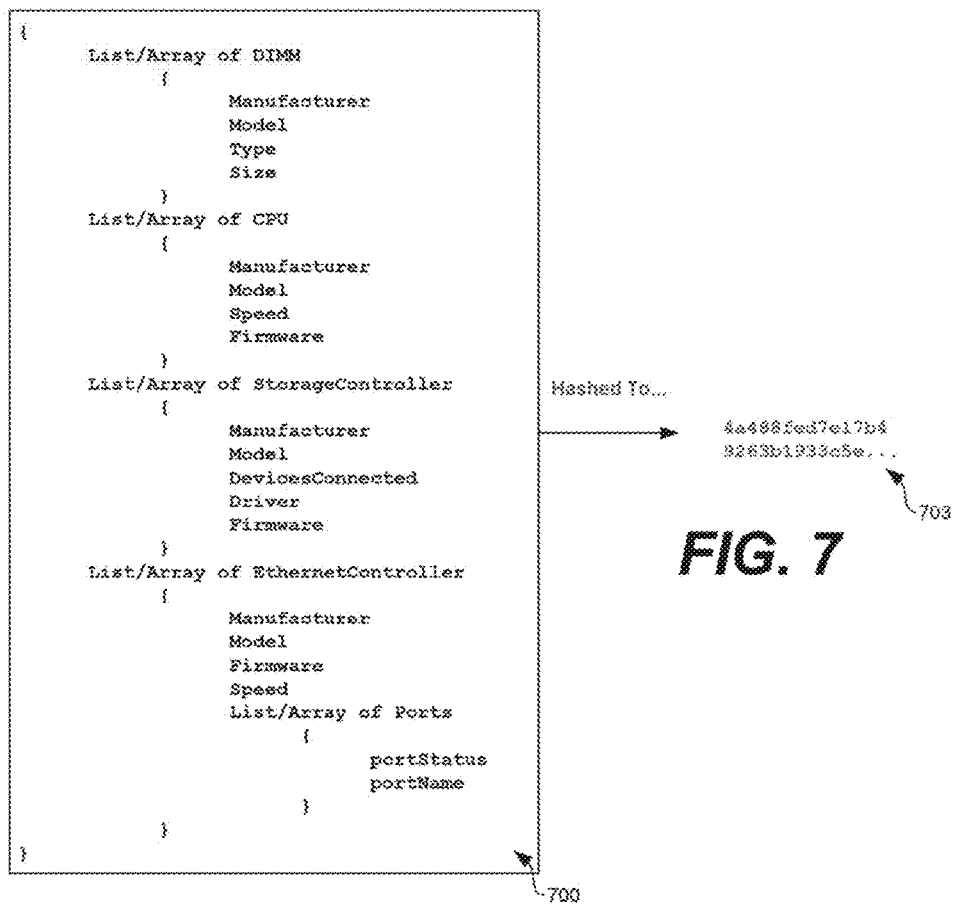
FIG. 7 is a drawing of an example workload data structure used to generate a workload hash for a workload in a hyper-converged computing environment.
FIG. 8 is a drawing of an example database format for maintaining workload hashes for workloads assigned to hyper-converged computing devices.

Turning now to FIG. 7, an example of a workload data structure 700 for a workload 133 in a hyper-converged computing environment 100 is shown according to various examples. The workload data structure 700 can be stored in the data store 124 for access by the data store service 155. Additionally, the data store service 155 can update or remove entries in the workload data structure 700. The workload data structure 700 can represent what kind of servers, are eligible to be used by or assigned to a workload 133. Hence, the workload data structure 700 attributes for a device, such as a server 115, required to have in order for the workload 133 to be assigned to the device.

The attributes can include, for example, information pertaining to SIMM, DIMM, CPU, storage controller, and Ethernet controller attributes for the server 115, or similar information. For each physical or virtual component of the server 115, various information can be included in the device data structure 500, such as a manufacturer, a type, a model, a size, firmware version, driver version, speed, port status, port name, or other information.

Similar to the device data structure 500, the workload data structure 700 can include a string of alphanumeric and symbolic characters. The workload data structure 700 can be hashed to generate a workload hash 703. Hashing the workload data structure 700 can include, for example, converting the workload data structure 700 to a string of alphanumeric characters having a less amount of characters than the original workload data structure 700. In some examples, the string can include non-alphanumeric characters.

When hashed, certain portions or regions of the workload hash 703 can correspond to certain attributes of the workload 133 or required attributes for a server 115. To this end, the workload hash 703, as opposed to the device data structure 500 itself, can be analyzed or used to identify or compare attributes of the workload 133 to attributes of a device. In some examples, the hyper-converged management service 130 can generate the workload data structure 700 and the workload hash 703 when a workload 133 is created.

Moving on to FIG. 8, an example format for a database 800 used to maintain workload bashes 703 for workloads 133 is shown according to various examples. The database 800 of FIG. 8 can be stored in the data store 124 for access by the data store service 155. Additionally, the data store service 155 can update or remove entries in the database 800. Each entry in the database 800 can correspond to a workload 133 assigned to a hyper-converged computing device, such as a server 115. In one example, a workload 133 can be assigned an identifier (id), a workload hash 703 (workload_hash), a workload identifier (workload_id), and a workload status (workload_status). The identifier (id) and the workload identifier (workload_id) can include strings that uniquely identify a workload 133. Alternatively, a single workload identifier (workload_id) can be used to identify a group of workloads 133. Using an identifier that uniquely identifies a workload 133, the workload hash 703 for the workload 133 can be retrieved by the data store service 155.

Figure 9:
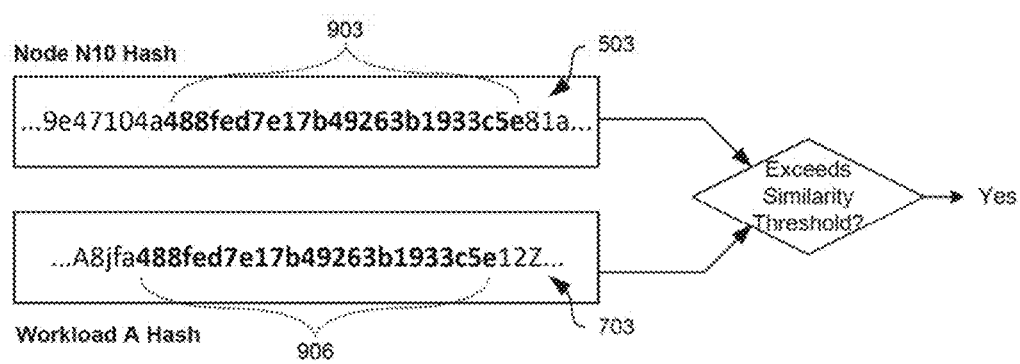
FIG. 9 is a drawing of a comparison of a device hash generated for a hyper-converged computing device to a workload hash generated for a workload.

Referring next to FIG. 9, a device hash 503 generated for a hyper-converged computing device is compared to a workload hash 703 generated for a workload 133 according to various examples. The hyper-converged management service 130 can identify a certain portion or region 903 of the device hash 503 having performance attributes while other portions of the string not having information pertaining to the performance attributes can be ignored. Additionally, the hyper-converged management service 130 can identify a portion or a region 903 of the workload hash 703 that corresponds to workload requirements. For instance, a certain region of the workload hash 703 having workload requirements can be identified by the hyper-converged management service 130 while other regions not having information pertaining to the workload requirements can be ignored.

The region 903 of the device hash 503 can be compared to the region 906 of the workload bash 703 and, if a similarity exceeds a similarity threshold, the workload 133 ("Workload A") can be assigned to the device or server 115 ("Node N10"). In further examples, an entirety of the device bash 503 can be compared to the region 906 of the workload hash 703, or vice versa. Alternatively, in further examples, an entirety of the device hash 503 can be compared to an entirety of the workload hash 703. In some examples, the hyper-converged management service 130 can utilize fuzzy matching, where matches less than 100% may be identified.

Turning now to FIG. 10, an example format of a database 1000 for maintaining configurations of hyper-converged computing devices is shown according to various examples. In some situations, the hyper-converged management service 130 can perform various network configurations to a server 115, for example, to more effectively handle workloads 133. Thus, many servers 115 in a hyper-converged computing environment 133 can be configured differently from one another. In the example of FIG. 10, the configurations performed to a server 115 can be stored as "operation_data." In some examples, the configurations performed are stored in the database 1000 as a plain-text data structure for quick access. In the event a server 115 begins failing, another server 115 can be quickly configured using the "operation_data" data structure 1003a . . . , 1003b. A workload 133 assigned to the failing server 115 can be assigned to the new server 115 that is now configured according the settings of the now failing server 115.

Figure 11:
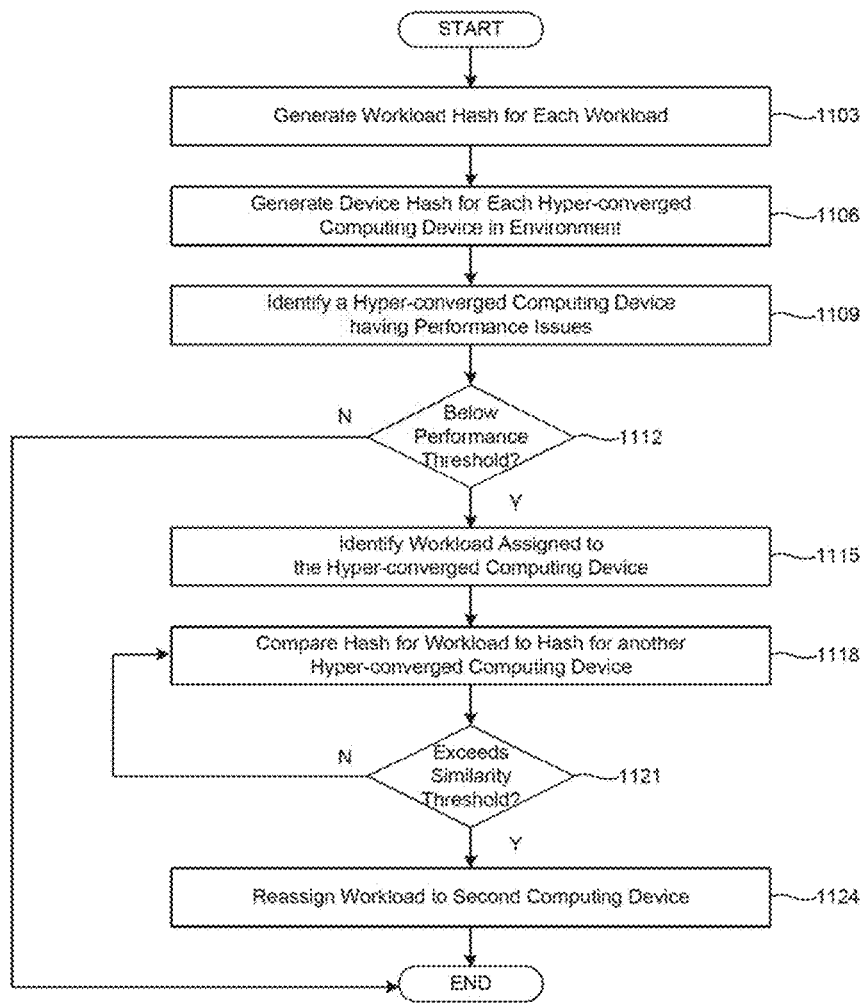
FIG. 11 is a flowchart illustrating functionality implemented by components of the networked environment.

Moving on to FIG. 11, shown is a flowchart that, provides one example of the operation of a portion of the hyper-converged computing environment 100. The flowchart of FIG. 11 can be viewed as depicting an example of elements of a method implemented by the hyper-converged management service 130 executing in the computing environment 103 according to one or more examples. The separation or segmentation of functionality as discussed herein is presented for illustrative purposes only.

Beginning with step 1103, the hyper-converged management service 130 can generate a workload hash 703 for each workload 133 handled in the hyper-converged computing environment 100. For instance, the hyper-converged management service 130 can maintain a listing of workloads 133 processed by the servers 115 in the computing systems 106. As anew workload 133 is created for processing, a data structure having attributes of the workload 133 can be created and maintained in the data store 124 during or after the life of the workload 133. Additionally, the data structure having the attributes of the workload 133 can be hashed to generate a workload hash 703.

Hashing the data structure can include, for example, converting the data structure to a string of alphanumeric characters, although, in some examples, the string can include non-alphanumeric characters. In some examples, certain portions or regions of the workload hash 703 can correspond to certain attributes. To this end, the workload hash 703 can be analyzed or used for attribute comparisons as opposed to the underlying data structure used to generate the workload hash 703. In some examples, step 1103 can be performed during a "bring up" operation of a rack 112, for example, when a rack 112 is powered on or otherwise brought online in the hyper-converged computing environment 100.

Next, in step 1106, the hyper-converged management service 130 can generate a device hash 503 for each server 115 or other device in the hyper-converged computing environment 100. The hyper-converged management service 130, for example, can maintain a listing of servers 115, switches 118, and other physical or virtual devices implemented in the computing systems 106. As a new server 115 or switch 118 is powered on in a rack 112, a data structure having attributes of the device can be created and maintained in the data store 124. The attributes for the, devices can include, for example, the capabilities of the device. The capabilities can include, for example, memory availability, processor speed, networking speed, firmware versions, or other capabilities. Additionally, the data structure having the attributes of the workload 133 can be hashed to generate a device hash 503. Similar to, the step of 1103, hashing the data structure can include, for example, converting the data structure to a string of alphanumeric characters. In some examples, however, the string can include non-alphanumeric characters. Certain portions or regions of the device hash 503 can correspond to certain attributes of the device. Hence, the device hash 503 can be analyzed or used for attribute comparisons as, opposed to the underlying data structure used to generate the device hash 503

Next, in step 1109, a hyper-converged management service 130 can identify a hyper-converged computing device having performance issues. For instance, as the hyper-converged management service 130 oversees the performance of the devices in the computing systems 106, the hyper-converged management service 130 can identify when a server 115, switch 118, or other component becomes faulty. For example, a server 115 can be identified having a significant drop in processing ability or a switch 118 can be identified as having unusually low routing speeds.

In step 1112, the hyper-converged management service 130 can determine whether the performance of the hyper-converged computing device falls below a performance threshold. For instance, a switch 118 having a speed capability of 100 Gb/s can be identified as having performance issues as the switch 118 is currently routing network traffic 136 at a speed of 22 Gb/s. A performance threshold can require switches 118 to perform at at least 70% of its speed attribute. As 22 Gb/s is below 70% of 100 Gb/S, performance of the switch 118 has fallen below the performance threshold. If the hyper-converged management service 130 determines that the performance of the hyper-converged computing device does not fall below a performance threshold, the process can proceed to completion.

Alternatively, if the hyper-converged management service 130 determines that the performance of the hyper-converged computing device falls below a performance threshold, the process can proceed to step 1115. In step 1115, the hyper-converged management service 130 can identify one or more workloads 133 assigned to the hyper-converged computing device identified in step 1109. For instance, as the hyper-converged computing device is not adequately performing, the worldoad 133 can be reassigned to another hyper-converged computing device. In one example, the data store service 155 can query the data store 124 using an identifier (ID) corresponding to the faulty hyper-converged computing device and return any workloads 133 assigned to that identifier.

Thereafter, in step 1118, the hyper-converged management service 130 can compare a workload hash 703 for the workload 133 identified in step 1115 to device hashes 503 corresponding to other hyper-converged computing devices, for example, to determine whether the attributes or requirements of the workload 133 match that of the hyper-converged computing device. As discussed above with respect to FIG. 9, one or more regions of the workload hash 703 can correspond to certain attributes. The hyper-converged management service 130 can compare portions or regions of the workload hash 703 for the workload 133 to corresponding portions or regions of the device hash 503. In some examples, an entirety of the workload hash 703 can be compared to an entirety of the device hash 503.

In some examples, the hyper-converged management service 130 can utilize fuzzy matching when comparing the workload hash 703 to the device hash 503. To this end, the hyper-converged management service 130 can generate a similarity metric indicative of the similarity of the workload hash 703 and the device hash 503.

In step 1121, the hyper-converged management service 130 can determine whether the similarity of the workload hash 703 and the device hash 503 exceeds a similarity threshold indicative of the hyper-converged computing device being a good match for the workload 133. If the hyper-converged management service 130 determines that the similarity of the workload hash 703 and the device hash 503 does not exceed a similarity threshold, the process can revert to step 1118 to compare the workload hash 703 to a device hash 503 for another, different hyper-converged computing device. This process can repeat until a decent match is identified.

Alternatively, if the hyper-converged management service 130 determines that the similarity of the workload hash 703 and the device hash 503 exceeds the similarity threshold, in step 1124, the hyper-converged management service 130 can reassign the workload 133 to the available hyper-converged computing device. In other words, the workload 133 is transferred from the faulty hyper-converged computing device to another hyper-converged computing device having attributes that match the requirements of the workload 133. Thereafter, the process can proceed to completion.

Figure 12:
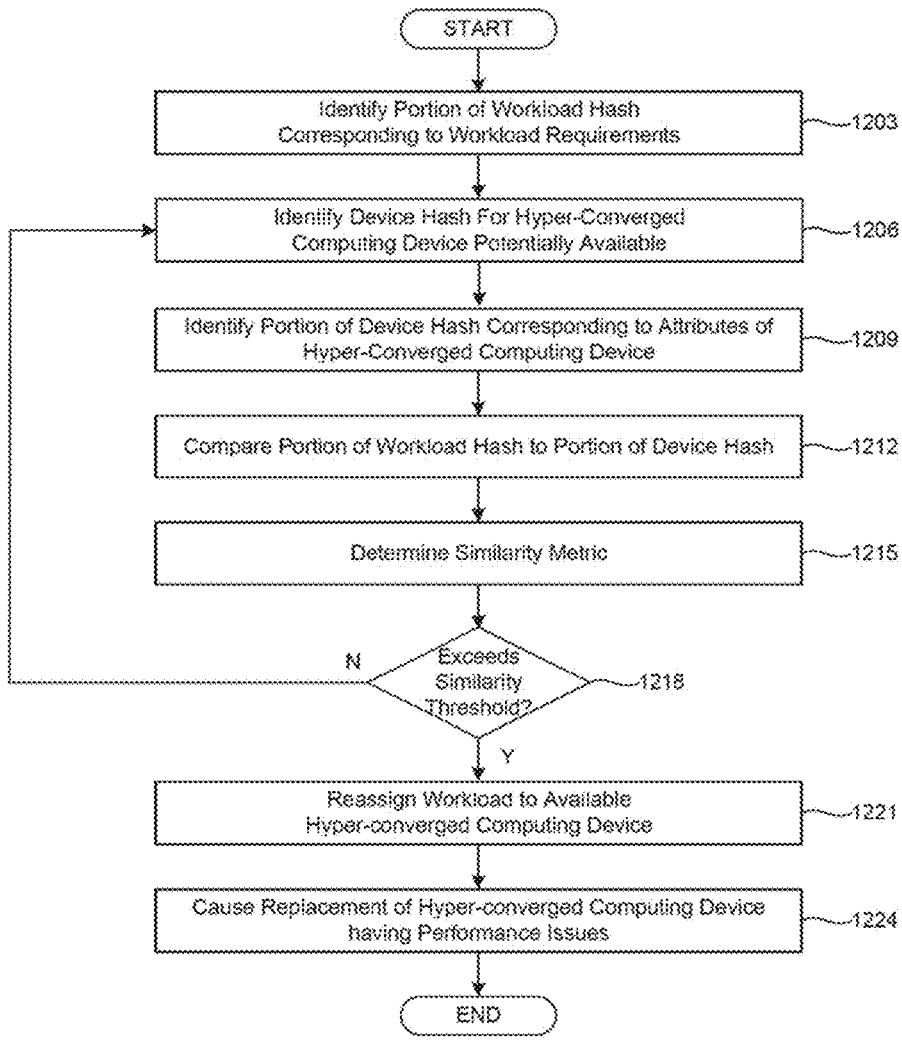
FIG. 12 is a flowchart illustrating functionality implemented by components of the networked environment.

Referring next to FIG. 12, shown is a flowchart that provides one example of the operation of a portion of the hyper-converged computing environment 100. The flowchart of FIG. 12 can be viewed as depicting an example of elements of a method implemented by the hyper-converged management service 130 executing in the computing environment 103 according to one or more examples. The separation or segmentation of functionality as discussed herein is presented for illustrative purposes only.

The flowchart of FIG. 12 provides additional steps for step 1118, described above, with respect to FIG. 11. Beginning with, step 1203, the hyper-converged management service 130 can identify a portion or a region of the workload hash 703 that corresponds to workload requirements. For instance, a certain region of the workload hash 703 having workload requirements can be identified by the hyper-converged management service 130 while other regions not having information pertaining to the workload requirements can be ignored.

In step 1206, the hyper-converged management service 130 can a device hash 503 for a hyper-converged computing device that is potentially available to handle assignment of the workload 133. For instance, the data store service 155 can query the data store 124 to identify available servers 115 not processing workloads 133 or servers 115 processing workloads 133 while having sufficient resources to process additional workloads 133.

In step 1209, the hyper-converged management service 130 can identify a portion or a region of the device hash 503 that corresponds to attributes of the hyper-converged management service 130. For instance, a certain region of the device hash 503 having performance attributes can be identified by the hyper-converged management service 130 while other regions not having information pertaining to the performance attributes can be ignored.

Next, in step 1212, the hyper-converged management service 130 can compare the portion of the workload hash 703 identified in step 1203 to the portion of the device has XXX identified in 1209. In other examples, an entirety of the workload hash 703 can be compared, to an entirety of the device hash 503.

In some examples, the hyper-converged management service 130 can utilize fuzzy matching when generating the similarity metric the workload hash 703 to the device hash 503. Thus, in step 1121, the hyper-converged management service 130 can generate a similarity metric indicative of the similarity of the workload hash 703 and the device hash 503. For instance, a similarity metric can include 0.9 when the workload hash 703 is 90% similar to the device hash 503.

In step 1218, the hyper-converged management service 130 can determine whether the similarity of the workload hash 703 and the device hash 503 exceeds a similarity threshold indicative of the hyper-converged computing device being a good match for the workload 133. If the hyper-converged management service 130 determines that the similarity of the workload hash 703 and the device hash 503 does not exceed a similarity threshold, the process can revert to step 1206 to compare the workload hash 703 to a device hash 503 for another, different hyper-converged computing device. This process can repeat until a decent match is identified.

Alternatively, if the hyper-converged management service 130 determines that the similarity of the workload hash 703 and the device hash 503 exceeds the similarity threshold, the process can proceed to step 1221. In step 1221, the hyper-converged management service 130 can reassign the workload 133 to the available hyper-converged computing device. The workload 133 is transferred from the faulty hyper-converged computing device to another hyper-converged computing device having attributes that match the requirements of the workload 133.

Additionally, in step 1224, the hyper-converged management service 130 can cause a replacement of the hyper-converged computing device having performance issues. For instance, the hyper-converged management service 130 can notify data center personnel of the faulty device and programmatically generate a wiring diagram similar to the diagram of FIG. 3 to instruct replacement of a faulty server 115, switch 118, or other component. Installation of a new server 115 is described in greater detail below with respect to FIG. 13. Thereafter, the process can proceed to completion.

Figure 13:
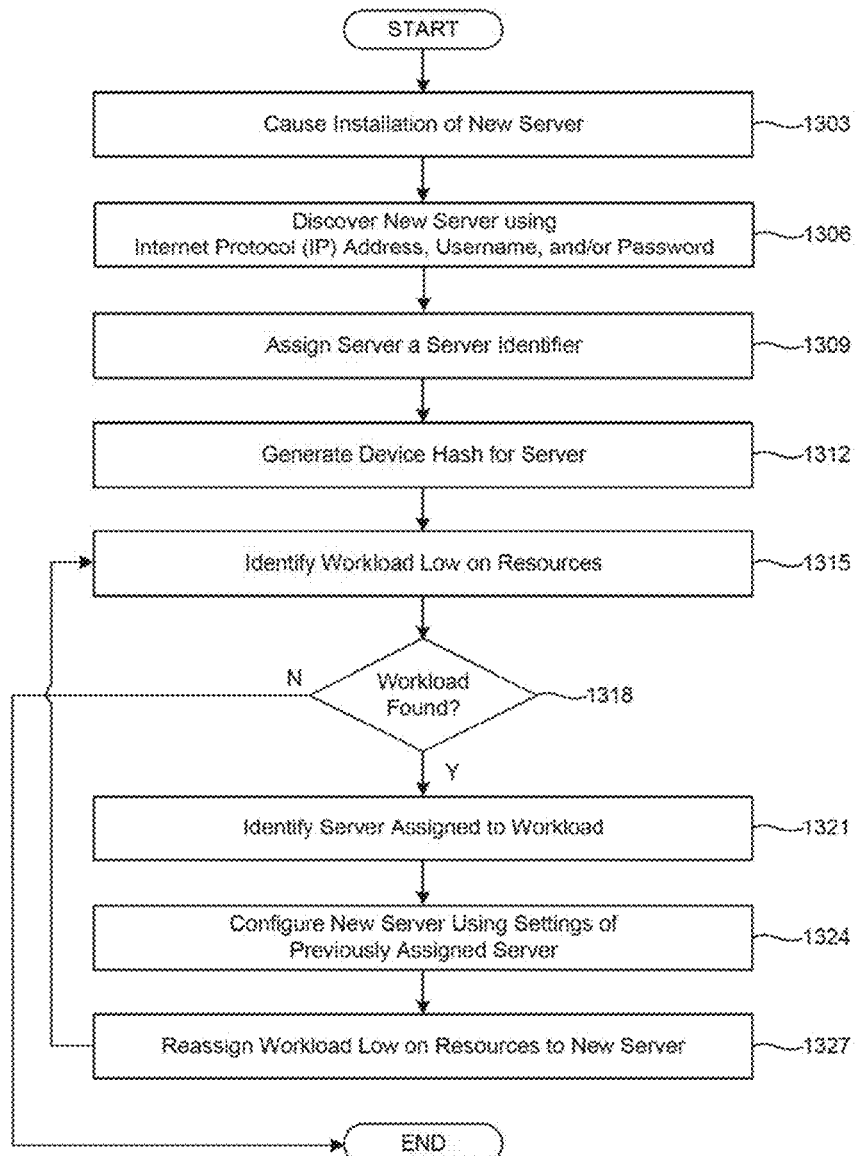
FIG. 13 is a flowchart illustrating functionality implemented by components of the networked environment.

Moving on to FIG. 13, shown is a flowchart that provides one example of the operation of a portion of the hyper-converged computing environment 100. The flowchart of FIG. 13 can be viewed as depicting an example of elements of a method implemented by the hyper-converged management service 130 executing in the computing environment 103 according to one or more examples. The separation or segmentation of functionality as discussed herein is presented for illustrative purposes only.

Beginning with step 1303, the hyper-converged management service 130 can cause installation of a new server 115. For instance, a new server 115 can be installed to scale up the resources of the hyper-converged computing environment 100 or, alternatively, a new server 115 can be used to swap out a faulty server 115. For instance, the hyper-converged management service 130 can notify data center personnel of the faulty device and programmatically generate a wiring diagram similar to the diagram of FIG. 3 to instruct replacement of a faulty server 115, switch 118, or other component. Data center personnel can configure the server 115 to have a particular internet protocol (IP) address, username, password, or other setting prior to installation of the server 115 in a rack 112.

In step 1306, the hyper-converged management service 130 can discover the new server 115 over the network 109 after it has been installed in a rack 112, for example, using the IP address, username, password, or other setting.

Thereafter, in step 1309, the hyper-converged management service 130 can assign the new server 115 a server identifier, also referred to as a node identifier. The server identifier can include an alphanumeric string that uniquely identifies the new, server 115. Information pertaining to the new server 115, such as attributes for the new server 115, can be used to generate a data structure which is then stored and maintained, in the data store 124.

In step 1312, the hyper-converged management service 130 can generate a device bash for the new server 115, for example, using the data structure or other information stored in association with the server 115 in the data store 124. Hashing the data structure can include, for example, converting the data structure to a string of alphanumeric characters, although, in some examples, the string can include non-alphanumeric characters. In some examples, certain portions or regions of the workload hash 703 can correspond to certain attributes. To this end, the device hash 503 can be analyzed or used for attribute comparisons as opposed to the underlying data, structure used to generate the device hash 503.

Next, in step 1315 the hyper-converged management service 130 can identify a workload 133 low on resources. Workloads 133 compete for resources of the computing systems 106 and, in some scenarios, some workloads 133 are low on resources increasing the likelihood of the workloads 133 not being processed in a timely manner.

In step 1318, the hyper-converged management service 130 can determine whether a workload 133 has been found that is low on resources. If no workload 133 is located that is low on resources, the process can proceed to completion. Alternatively, if a workload 133 is located that is low on resources, the process can proceed to step 1321.

In step 1321, the hyper-converged management service 130 can identify the server 115 to which the workload 133 is assigned. The data store service 155 can query the data store 124 using an identifier for the workload 133 identified in step 1315 which can return an identifier for the server 115 to which the workload 133 is assigned.

In step 1324, the hyper-converged management service 130 can configure the new server 115 using the settings of the server identified in step 1321. For example, some servers 115 are configured to process certain types of workloads. As a new server 115 has been added which is available for processing, the server 115 can be configured to process the workload 133 based on the settings of the currently assigned server 115. For instance, the configurations performed to a server 115 can be stored as "operation_data" in the data store 124 where all configurations performed on the now failing server 115 are stored as a plain-text data structure for quick retrieval. In the event a server 115 begins failing, another server 115 can be quickly configured using the "operation_data" data structure and without having to perform any intermediate operations. A workload 133 assigned to the failing server 115 can be assigned to the new server 115 that is now configured according the settings of the now failing server 115.

In step 1327, the hyper-converged management service 130 can reassign the workload 133 to the new server 115 as it is now configured to process the workload 133 using the settings previously applied to the failing server 115. The data store service 155 can update the data store 124 to reflect the reassignment of the workload 133 to the new server 115. Thereafter, the process can proceed to completion.

The servers 115 or other devices comprising the computing environment 103 and the computing systems 106 can include at least one processor circuit, for example, having at least one hardware processor and at least one physical memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. Also stored in the memory can be a data store 124 and other data.

A number of software components are stored in the memory and executable by a processor. In this respect, the term "executable" means a program file that is a form that can, ultimately be run by the processor. Examples of executable programs can be, for example, a compiled program that can be translated into machine code in a format that can be loaded into a random access portion of one or more of the memory devices and ran by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the hyper-converged management service 130. These client devices can include a display upon which a user interface generated by a client application can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the hyper-converged management service 130 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic, or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:

at least one computing device comprising memory; and
program instructions stored in the memory and executable in the at least one computing device that, when executed, cause the at least one computing device to:
generate a workload hash for a workload to be processed by a first one of a plurality of hyper-converged computing devices in a hyper-converged virtual computing environment;
generate a device hash for at least a second one of the plurality of hyper-converged computing devices in the hyper-converged virtual computing environment;
determine that the first one of the plurality of hyper-converged computing devices tasked with processing the workload has a performance falling below a performance threshold;
in response to the performance falling below the performance threshold, compare the workload hash generated for the workload to the device hash generated for the second one of the plurality of hyper-converged computing devices;
generate a similarity metric describing a similarity of the workload hash with respect to the device hash; and
in response to the similarity metric meeting a similarity threshold, reassign the workload to the second one of the plurality of hyper-converged computing devices for processing.

2. The system of claim 1, wherein comparing the workload hash generated for the workload to the device hash generated for the second one of the plurality of hyper-converged computing devices comprises:
identifying a portion of the workload hash corresponding to workload requirements;
identifying a portion of the device hash corresponding to device attributes; and
comparing the portion of the workload hash to the portion of the device hash to determine the similarity of the workload hash to the device hash.

3. The system of claim 2, wherein comparing the portion of the workload hash to the portion of the device hash utilizes fuzzy matching.

4. The system of claim 1, further comprising program instructions stored in the memory and executable in the at least one computing device that, when executed, cause the at least one computing device to:
discover an installation of a new hyper-converged computing device in the hyper-converged virtual computing environment; and
generate a new device hash for the new hyper-converged computing device.

5. The system of claim 3, wherein the workload is a first one of a plurality of workloads; and
further comprising program instructions stored in the memory and executable in the at least one computing device that, when executed, cause the at least one computing device to:
identify a second one of the plurality of workloads that is low on resources;
identify a previously assigned one of the plurality of hyper-converged computing devices that was tasked with processing the second one of the plurality of workloads;
configure the new hyper-converged computing device using at least one setting of the previously assigned one of the plurality of hyper-converged computing devices; and
assign the second one of the plurality of workloads low on resources to the new hyper-converged computing device.

6. The system of claim 1, wherein the workload comprises a plurality of tasks to be processed by at least one of the plurality of hyper-converged computing devices in the hyper-converged virtual computing environment.

7. The system of claim 1, wherein:
the device hash is generated from a first data structure;
the workload hash is generated from a second data structure;
the device hash comprises a first string of alphanumeric characters having a length less than the first data structure; and
the workload hash comprises a second string of alphanumeric characters having a length less than the second data structure.

8. A non-transitory computer-readable medium embodying program code executable in at least one computing device that, when executed by the at least one computing device, causes the at least one computing device to:
generate a workload hash for a workload to be processed by a first one of a plurality of hyper-converged computing devices in a hyper-converged virtual computing environment;
generate a device hash for at least a second one of the plurality of hyper-converged computing devices in the hyper-converged virtual computing environment;
determine that the first one of the plurality of hyper-converged computing devices tasked with processing the workload has a performance falling below a performance threshold;
in response to the performance falling below the performance threshold, compare the workload hash generated for the workload to the device hash generated for the second one of the plurality of hyper-converged computing devices;
generate a similarity metric describing a similarity of the workload hash with respect to the device hash; and
in response to the similarity metric meeting a similarity threshold, reassign the workload to the second one of the plurality of hyper-converged computing devices for processing.

9. The non-transitory computer-readable medium of claim 8, wherein comparing the workload hash generated for the workload to the device hash generated for the second one of the plurality of hyper-converged computing devices comprises:
identifying a portion of the workload hash corresponding to workload requirements;
identifying a portion of the device hash corresponding to device attributes; and
comparing the portion of the workload hash to the portion of the device hash to determine the similarity of the workload hash to the device hash.

10. The non-transitory computer-readable medium of claim 9, wherein comparing the portion of the workload hash to the portion of the device hash utilizes fuzzy matching.

11. The non-transitory computer-readable medium of claim 9, wherein:
the device hash is generated from a first data structure;
the workload hash is generated from a second data structure;
the device hash comprises a first string of alphanumeric characters having a length less than the first data structure; and
the workload hash comprises a second string of alphanumeric characters having a length less than the second data structure.

12. The non-transitory computer-readable medium of claim 8, further comprising program code executable in the at least one computing device that, when executed, causes the at least one computing device to:
discover an installation of a new hyper-converged computing device in the hyper-converged virtual computing environment; and
generate a new device hash for the new hyper-converged computing device.

13. The non-transitory computer-readable medium of claim 12, wherein the workload is a first one of a plurality of workloads; and
further comprising program code executable in the at least one computing device that, when executed, causes the at least one computing device to:
identify a second one of the plurality of workloads that is low on resources;
identify a previously assigned one of the plurality of hyper-converged computing devices that was tasked with processing the second one of the plurality of workloads;
configure the new hyper-converged computing device using at least one setting of the previously assigned one of the plurality of hyper-converged computing devices; and
assign the second one of the plurality of workloads low on resources to the new hyper-converged computing device.

14. The non-transitory computer-readable medium of claim 8, wherein the workload comprises a plurality of tasks to be processed by at least one of the plurality of hyper-converged computing devices in the hyper-converged virtual computing environment.

15. A computer-implemented method, comprising:
generating a workload hash for a workload to be processed by a first one of a plurality of hyper-converged computing devices in a hyper-converged virtual computing environment;
generating a device hash for at least a second one of the plurality of hyper-converged computing devices in the hyper-converged virtual computing environment;
determining that the first one of the plurality of hyper-converged computing devices tasked with processing the workload has a performance falling below a performance threshold;
in response to the performance falling below the performance threshold, comparing the workload hash generated for the workload to the device hash generated for the second one of the plurality of hyper-converged computing devices;
generating a similarity metric describing a similarity of the workload hash with respect to the device hash; and
in response to the similarity metric meeting a similarity threshold, reassigning the workload to the second one of the plurality of hyper-converged computing devices for processing.

16. The computer-implemented method of claim 15, wherein comparing the workload hash generated for the workload to the device hash generated for the second one of the plurality of hyper-converged computing devices comprises:
identifying a portion of the workload hash corresponding to workload requirements;
identifying a portion of the device hash corresponding to device attributes; and
comparing the portion of the workload hash to the portion of the device hash to determine the similarity of the workload hash to the device hash.

17. The computer-implemented method of claim 16, wherein comparing the portion of the workload hash to the portion of the device hash utilizes fuzzy matching.

18. The computer-implemented method of claim 15, wherein the workload is a first one of a plurality of workloads; and
wherein the computer-implemented method further comprises:
discovering an installation of a new hyper-converged computing device in the hyper-converged virtual computing environment;
generating a new device hash for the new hyper-converged computing device;
identifying a second one of the plurality of workloads that is low on resources;
identifying a previously assigned one of the plurality of hyper-converged computing devices that was tasked with processing the second one of the plurality of workloads;
configuring the new hyper-converged computing device using at least one setting of the previously assigned one of the plurality of hyper-converged computing devices; and
assigning the second one of the plurality of workloads low on resources to the new hyper-converged computing device.

19. The computer-implemented method of claim 15, wherein the workload comprises a plurality of tasks to be processed by at least one of the plurality of hyper-converged computing devices in the hyper-converged virtual computing environment.

20. The computer-implement method of claim 15, wherein:
the device hash is generated from a first data structure;
the workload hash is generated from a second data structure;
the device hash comprises a first string of alphanumeric characters having a length less than the first data structure; and
the workload hash comprises a second string of alphanumeric characters having a length less than the second data structure.

* * * * *